No. 689,587. Patented Dec. 24, 1901.
C. E. HOBBS.
LACE STRETCHING FRAME.
(Application filed Apr. 11, 1901.)

(No Model.)

UNITED STATES PATENT OFFICE.

CLARENCE E. HOBBS, OF MILWAUKEE, WISCONSIN.

LACE-STRETCHING FRAME.

SPECIFICATION forming part of Letters Patent No. 689,587, dated December 24, 1901.

Application filed April 11, 1901. Serial No. 55,271. (No model.)

*To all whom it may concern:*

Be it known that I, CLARENCE E. HOBBS, a citizen of the United States, and a resident of Milwaukee, in the county of Milwaukee and State of Wisconsin, have invented certain new and useful Improvements in Lace-Stretching Frames; and I do hereby declare that the following is a full, clear, and exact description thereof.

My invention has for its object to provide simple, economical, and self-supporting portable knockdown frames upon which to stretch and dry laundered lace goods, especially curtains, said invention consisting in certain peculiarities of construction and combination of parts hereinafter particularly set forth with reference to the accompanying drawings and subsequently claimed.

Figure 1 of the drawings represents a side elevation of a frame in accordance with my invention set up for use; Fig. 2, an end elevation of one of the frame-standards partly broken and adjustably connected to frame-bars that are shown in vertical transverse section; and Fig. 3, a detail elevation of a corner of the frame, partly in section, this view being indicated by line 3 3 in the first figure.

Referring by letter to the drawings, A indicates each of a pair of standards that constitute parts of my improved frame. Each standard has a foot B, extending at right angles thereto in opposite directions, and said standard is also provided with a longitudinal slot for the greater part of its length. One of the standards is provided with an upper end tenon $b$, and apertured side ears $c$ are made fast to the upper end of the other standard to extend above the same. An upper bar C is provided with an under edge mortise for engagement of the standard-tenon $b$, and a hook $c'$, connected to the under edge of the bar, engages an eye $d$ in connection with the inner edge of said standard, the hook and eye constituting a hinge. Another hook $e$, depending from bar C, engages an eye at one end of a brace-rod D, the other end of this rod being made to have detachable engagement with the adjacent standard, preferably flush with the same, said standard being shown with a recess or seat for said rod.

The bar C is apertured at intervals of its length, and any one of these apertures being put into register with those in standard-ears $c$, between which said bar has support, the joint is secured by a pin $f$ run through said apertures, this pin being preferably connected by a cord $g$ or other flexible device with an eye $h$, with which the adjacent standard is provided.

Bolts $i$ engage the standard-slots, an eye, and a longitudinal slot in a bar E, clamp-nuts $j$ being run on screw-threaded ends of said bolts against the bar to hold the latter in adjusted position vertically of the standards.

From the foregoing it will be readily understood that the distance between standards and between bars of the frame may be readily regulated to suit the dimensions of the lace-work to be stretched on said frame, and it would be no departure from my invention to substitute a longitudinal slot for the apertures in the upper bar.

Pins or hooks of various kinds are employed in connection with the frame-standards and with the bar E for engagement with the lace-work stretched upon the frame over bar C, the preferred lace-catches $k$ herein shown being strips of wire each bent to form a central eye that is engaged by a screw or equivalent device run in the adjacent standard or bar. Hence said catches are pivotally adjustable to be swung in parallel with adjacent frame members out of the way when not required for use.

To knock down the frame, the adjustable standard is detached from the bars and the brace D uncoupled from the stationary standard. Both bars are then swung parallel with the stationary standard, and the adjustable standard is laid alongside of the other frame members to be tied with the same in a compact bundle requiring very little space for storage.

Having thus described my invention, what I claim as new, and desire to secure by Letters Patent, is—

A portable lace-stretching frame comprising a stationary standard, a movable standard, an upper bar having hinge connection with the stationary standard and provided with an under edge end mortise for the engagement of an upper end tenon of said stationary standard, a brace-rod connecting said bar and the aforesaid stationary standard when there is engagement of said tenon and mortise, a lower bar adjustable vertically of both standards, means for holding the movable standard in adjusted position lengthwise of both bars, and lace-catches on the standards and lower bar.

In testimony that I claim the foregoing I have hereunto set my hand, at Milwaukee, in the county of Milwaukee and State of Wisconsin, in the presence of two witnesses.

C. E. HOBBS.

Witnesses:
N. E. OLIPHANT,
H. H. MEIXSELL.